United States Patent [19]

Pietzarka et al.

[11] Patent Number: 4,508,666

[45] Date of Patent: Apr. 2, 1985

[54] PROCESS FOR COOLING AND COMMINUTING MOLTEN CALCIUM CARBIDE

[75] Inventors: Wilhelm F. Pietzarka; Albrecht Malten, both of Dortmund; Georg Strauss, Erftstadt, all of Fed. Rep. of Germany

[73] Assignee: Hoechst Aktiengesellschaft, Fed. Rep. of Germany

[21] Appl. No.: 478,893

[22] Filed: Mar. 28, 1983

[30] Foreign Application Priority Data

May 17, 1980 [DE] Fed. Rep. of Germany ....... 3018921

[51] Int. Cl.³ .............................................. B29C 23/00
[52] U.S. Cl. ........................................ 264/12; 241/23;
 264/7; 264/9; 264/DIG. 51; 264/37; 425/7
[58] Field of Search ............ 264/12, 6, 7, 9, DIG. 51;
 425/7, 10; 241/23

[56] References Cited

U.S. PATENT DOCUMENTS

| | | | |
|---|---|---|---|
| 2,965,922 | 12/1960 | Toulmin, Jr. | 425/7 |
| 3,043,652 | 7/1962 | Schytil | 264/DIG. 51 |
| 3,856,441 | 12/1974 | Suzukawa et al. | 264/12 |
| 4,233,007 | 11/1980 | Karlsson | 264/12 |

Primary Examiner—Jeffery Thurlow
Assistant Examiner—Patrick M. Dailey
Attorney, Agent, or Firm—Connolly and Hutz

[57] ABSTRACT

The invention relates to a process comprising the cooling and comminuting of molten calcium carbide, wherein a molten stream of calcium carbide is tapped off from a furnace at 1900° to 2100° C., cooled and comminuted. More particularly, the molten calcium carbide is initially comminuted into droplets and the droplets are cooled to less than 200° C. The process can be carried out with the aid of an apparatus comprised of a heatable or coolable feed duct, a nozzle for comminuting the molten stream, and a series of fluidized bed cooling zones.

4 Claims, 2 Drawing Figures

PROCESS FOR COOLING AND COMMINUTING MOLTEN CALCIUM CARBIDE

This application is a continuation-in-part of Ser. No. 06/262,338 filed May 11, 1981 which is now abandoned.

The present invention relates to a process comprising the cooling and comminuting of molten calcium carbide, wherein calcium carbide is tapped off from a furnace at a temperature of 1900° to 2100° C., cooled and comminuted.

A process has been described (cf. U.S. Pat. Spec. No. 3,741,414 to Krause et al. issued June 26, 2973 wherein molten calcium carbide yielding 295 liters of acetylene per kilogram of the carbide (295 l/kg) on being subjected to gasification is placed in a rail-guided container and precooled therein over a period of 4 hours to a surface temperature of about 600° C. The resulting carbide block is taken from the container, delivered on to a slow speed conveyor system, allowed to cool thereon to about 200° C. within 14 hours, and ultimately pre-crushed by means of a coarse crusher to material with a size of about 100 mm in diameter. Next, the pre-crushed calcium carbide is placed in a layer about 30 cm thick on to a box-typed conveyor which is operated at a speed necessary for the calcium carbide coming therefrom to have a temperature of about 150° C. Calcium carbide which is so treated still yields 293.5 liters of acetylene per kg carbide (239.5 l/kg), i.e. 1.5 l/kg less than the carbide starting material.

While the process just described compares favorably with that disclosed in U.S. Pat. Spec. No. 3,201,052 (Feldmann et al.) issued Aug. 17, 1965, the fact remains that it is not satisfactory in respect of the following: It entails great complexity of apparatus and provides for the calcium carbide to be cooled over excessively long periods within a production plant which requires too much space for accomodation and entails heavy loss of acetylene.

The present invention now provides a process which enables the cooling periods of calcium carbide to be considerably shortened; the expenditure of apparatus to be minimized; the space requirements to be reduced; granular calcium carbide of about 150° C. to be obtained for a minimum loss of acetylene; and the utilization of energy to be optimized.

To this end, the process of this invention provides for molten calcium carbide to be initially disintegrated into droplets and for the droplets to be cooled to less than about 200° C. As a result of the calcium carbide being comminuted into droplets, the surface of the individual calcium carbide particles is practically instantaneously enlarged so that the radiation of heat and/or exchange of heat in contact with a cooling medium is considerably improved. As a further desirable result of the present process, it is no longer necessary for cooling steps to be carried out with the use of rail-guided systems, conveyor belts, cooling chutes, cranes and a plurality of rail-guided containers, or for the calcium carbide to be transported to large cooling houses for cooling therein.

The present invention provides more preferably for the calcium carbide droplets to be cooled in two stages, namely in a first stage to about 500° to 600° C. and, in the second stage, to about 150° C. From this latter stage, calcium carbide can be recovered in the form of granular material, after less than one hour. It has been found particularly advantageous for the calcium carbide droplets to be cooled in at least one fluidized bed comprised of solid particles and an inert gas. The step of cooling the calcium carbide in a fluidized bed has a technically high beneficial effect which resides in the very intense exchange of heat between the calcium carbide droplets on the one hand, and the bed of fluidized material and the cooling surface areas of the fluidized bed, on the other hand; as a result, it is possible for highly effective cooling of calcium carbide to be carried out in a relatively small space.

The invention also provides for granular calcium carbide to be conveyed through a fluidized bed as a suspended particulate medium of the bed and for molten carbide to be converted to droplets by means of a dispersing nozzle with the aid of an inert gas.

A still further embodiment of the present invention provides for the gas coming from the calcium carbide furnace to be used as the inert gas for forming the fluidized bed containing solid particles, for dispersing molten calcium carbide and conveying solid calcium carbide from the first to a second bed of fluidized material. This furnace gas, the pressure and flow rate of which can be varied, is preferably recycled. More particularly, this gas can be so-called carbide furnace gas, which generally contains about 85 volume % CO, about 12-15 volume % $H_2$ and traces of $N_2$, $CO_2$ and $CH_4$.

As a result of the steps just described, the calcium carbide droplets are not liable to undergo surface reactions so that it is possible for the acetylene yield to be considerably improved in the process of this invention.

To improve the efficiency of the entire process, and especially the recovery of heat, the invention provides for steps to be taken which permit use to be made of at least part of the heat contained in the calcium carbide, for the generation of steam.

It is also possible for the heat supplied to the inert gas (e.g. furnace gas) by polytropic compression to be used at least partially for the generation of steam .

Steam which is so generated can be used to operate a compressor (e.g. for compressing the inert gas used in the fluidizing bed), or employed for fluidizing solid matter and/or for operating an electric generator and/or for feeding to a general steam supply system.

Electrical energy which is so produced can in turn be used for the production of calcium carbide, e.g. for supplying power to the electrodes forming part of the calcium carbide furnace and/or for operating electric motors and/or for transmission to a general electric energy supply system.

The process of this invention can be carried out in an apparatus comprising a heatable or coolable feed duct, a nozzle for dispersing molten calcium carbide and two fluidized bed cooling zones series-connected together. A collecting and metering crucible is preferably arranged between the feed duct and dispersing nozzle, and a pneumatic conveyor system is preferably mounted between the two fluidized bed cooling zones. It is also preferable for the whole apparatus to be rendered gastight so as to minimize environmental pollution by smoke, dust, odor or noise.

To optimize the formation of calcium carbide droplets, it is also possible for the apparatus to be provided with structural components which are mounted in the dispersing nozzle and upon which impinges the jet of molten carbide, the structural components comprising, for example, edged drainers, means for disintegrating the jet of molten calcium carbide or for producing a lamella of molten calcium carbide.

EXAMPLE

Figure 1:
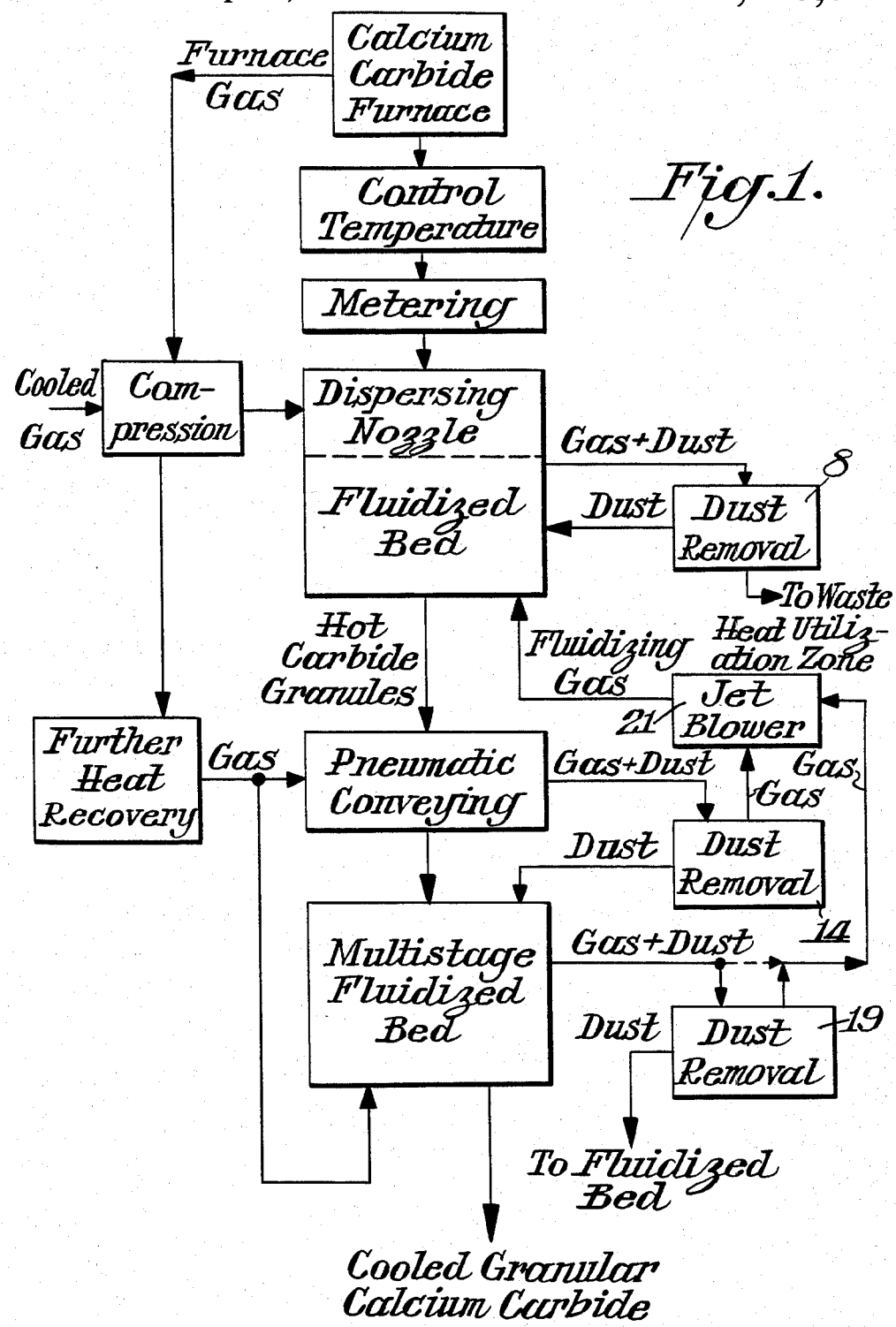
FIG. 1 is a flow sheet illustrating the process of this invention.

The flow sheet of FIG. 1 illustrates a process of this invention for cooling and comminuting molten calcium carbide and recovering the carbide in granular form with a temperature below 200° C. In the process as illustrated in FIG. 1, a stream of molten calcium carbide is tapped off from the furnace at the temperature of 1900° to about 2100° C., e.g. about 2000° C. The calcium carbide furnace (which also supplies furnace gas used as an "inert gas" in the process) can be tapped in a known manner, and the molten stream from the furnace can be heated or cooled to adjust the temperature of the stream upward (e.g. during the start-up period) or downward (using a cooling medium). After a suitable degree of heating or cooling, the molten stream is metered into a dispersing zone, which zone includes a dispersing nozzle.

The aforementioned calcium carbide furnace gas is compressed to provide a pressurized flow of furnace gas which is substantially inert toward calcium carbide and is used in the dispersing zone to disperse, for example, 10.9 m³/h of calcium carbide. The furnace gas having a temperature of 240° C. is used in the dispersing zone at a flow rate of, for example, 1800 m³/h and at a linear velocity of 100 m/second. The flow of compressed furnace gas through the first fluidized bed (downstream from the dispersing zone) is, for example 62200 m³/h; hence the combined flow of furnace gas from the dispersing zone and the first fluidized bed is approximately 64,000 m³/h, and the furnace gas introduced into the first fluidized bed is at a temperature of about 290° C. All of the above-mentioned furnace gas flow rates are measured at S.T.P., i.e. 1013 millibars and 273.25 K.

The molten stream of calcium carbide is dispersed in the dispersing zone with the aid of the dispersing nozzle and the pressurized flow of furnace gas, thereby comminuting the molten stream to form droplets of molten calcium carbide. The droplets cool and solidify in this first fluidized bed with a drop in temperature to about 500° to 600° C. The resulting hot calcium carbide granules are then conveyed with the aid of compressed furnace gas and a pneumatic conveying system to the second (multistage) fluidized bed, where a further drop in temperature to below 200° C. (e.g. about 150° C.) takes place during a residence time of less than an hour.

The average residence time in the first fluidized bed is about 20 minutes, during which time the 64,000 m³/h of effluent furnace gas (S.T.P.) is heated to about 600° C. and the molten calcium carbide is comminuted to form droplets having an average diameter of 5 mm, and this diameter can vary depending on the pressure and flow velocity selected for the furnace gas. The flow of furnace gas through the pneumatic conveying means is, for example, about 37,000 m³/h (measured at S.T.P.), and the gas is at about 135° C. in this step of the process. An illustrative flow of furnace gas to the multistage fluidized bed is about 31,500 m³/h, a typical residence time in the multistage fluidized bed being about 30 minutes, and the size of the granules recovered from the bed is typically up to about 6 mm in size. Part of the heat removed from the comminuted molten stream of calcium carbide in the first cooling zone can be introduced into a waste heat utilization zone in which the waste heat can be used to generate steam.

The compression of the furnace gas to provide a dispersing gas for the dispersing zone typically places this gas under a pressure of about 8 to 10 bars.

Figure 2:
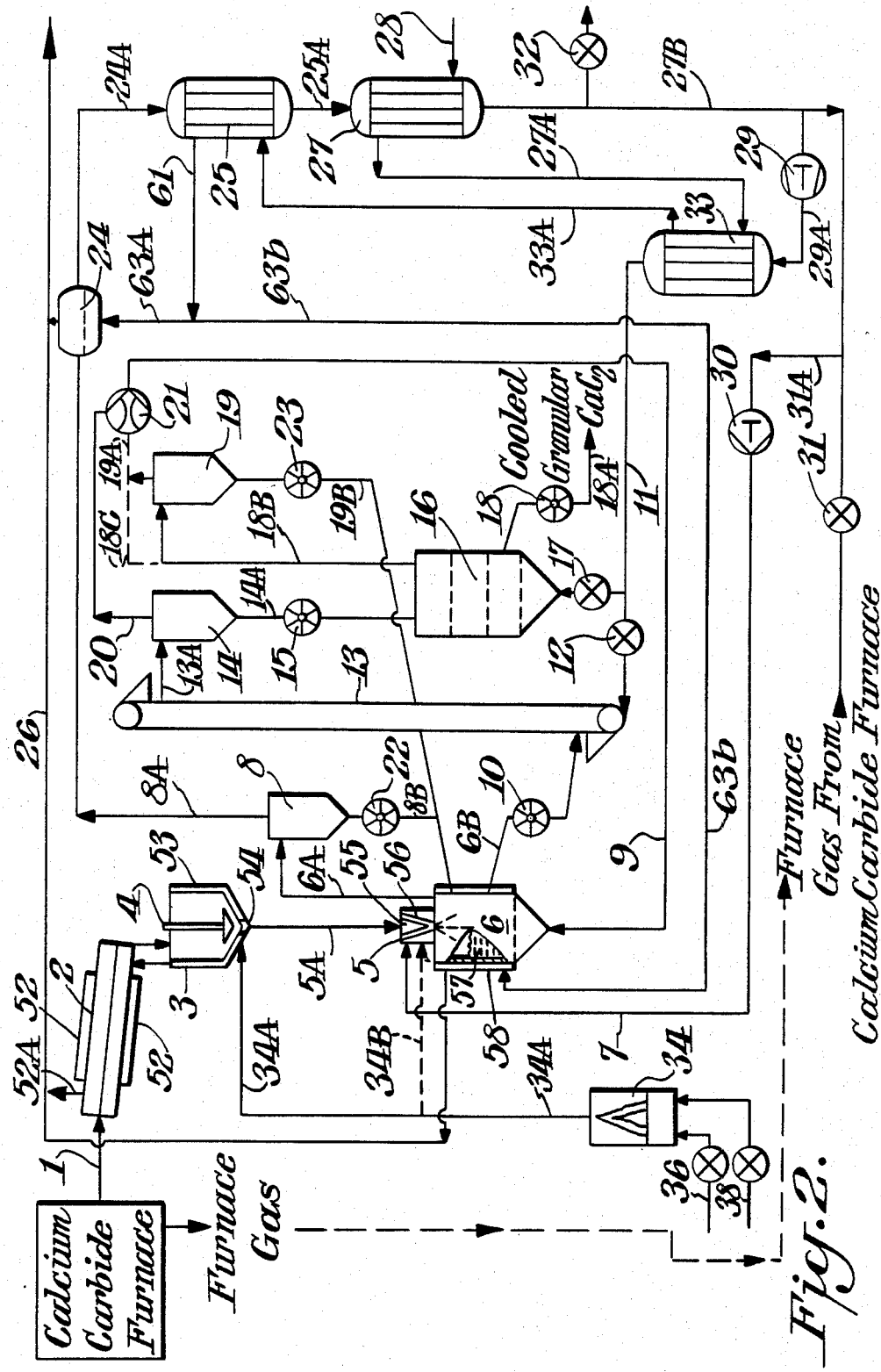
FIG. 2 is a schematic illustration of an apparatus suitable for carrying out the process of this invention.

An apparatus such as that described hereinafter with reference to FIG. 2 of the accompanying drawing is used for cooling about 20 tons/h calcium carbide from approximately 2000° C. to approximately 150° C., the waste heat being used for generating about 21.8 tons/h high pressure steam (350° C., 90 bars). To this end, 20 tons/h molten calcium carbide with a temperature of about 2000° C. tapped off through the tapping holes of one or more carbide furnaces is delivered through a conduit 1 to jacketed ducts 2 corresponding in number to the number of tapping holes. Each of the ducts 2 is provided with a jacket 52 permitting a cooling medium or, especially during the start up period, hot gas (smoke gas or burner off-gas) to be passed therethrough.

The molten calcium carbide travels through the ducts 2 to a collecting and metering crucible 3 which is surrounded by jacket 53, a portion of the inherent heat being lost by radiation. In this way, the calcium carbide temperature is reduced to about 1950° C. The outlet opening 54 of the collecting and metering crucible 3 is adjustable by means of a cone 4. Through the outlet opening, molten calcium carbide is delivered via conduit 5A to the central tube of a dispersing nozzle 5 which is arranged so as to open into a fluidized bed apparatus 6, also provided with a jacket, jacket 58. The dispersing nozzle 5 is a dual feed spray nozzle. Furnace gas (about 1800 m³/h carbide furnace gas, measured at S.T.P., i.e. at 1013 millibars and 273.15 K) at 240° C. flowing through a conduit 7 at a linear velocity of about 100 m/second is used for forcing the calcium carbide (about 10.9 m³/h) through an annular slit 56 formed around the central tube 55, whereby the jet of molten calcium carbide becomes disintegrated into a flow 57 of droplets. It is generally desirable for the droplets to have an average diameter of 5 mm, but those skilled in the art can, in the light of this disclosure, vary the diameter within wide limits, depending on the pressure and flow velocity selected for the furnace gas. Inside the fluidized bed apparatus 6, the flow 57 of droplets of molten calcium carbide is contacted counter-currently with hot furnace gas (62,200 m³/h carbide furnace gas, S.T.P.), which is introduced thereinto from below through conduit 9.

Combined furnace gas (approximately 64,000 m³/h carbide furnace gas, S.T.P.) of about 600° C. is taken via conduit 6A from the fluidized bed apparatus 6 through a dust removing cyclone 8, and the molten carbide droplets are allowed to drop into the fluidized bed in which they become rapidly cooled and solidify at once. The droplets and granulated calcium carbide originating therefrom rapidly deliver their heat by heat conduction and radiation (a) to furnace gas of about 290° C. which comes from conduit 9 and is introduced from below into the fluidized bed 6, through its bottom and (b) to the interior surfaces of the bed 6 which are cooled by steam generation in jacket 58. In the manner described, the calcium carbide becomes cooled to about 600° C. while the about 64,000 m³/h furnace gas, S.T.P., becomes heated to about 600° C. After an average residence time of 20 minutes, granulated calcium carbide of about 600° C. is taken via conduit 6B from the fluidized bed apparatus 6 through an overflow and a bucket wheel valve 10 and introduced together with about 30,700 m³/h furnace gas of about 135° C, S.T.P., travelling through conduit 11 and valve 12 into a second miltistage fluidized bed apparatus 16, the granulated calcium carbide being introduced thereinto through a pneumatically operated conveyor zone 13, conduit 13A a cyclone 14 line 14A and a further bucket wheel valve 15. In the multistage bed apparatus 16, the granulated calcium carbide is contacted in countercurrent fashion with about 31,500 m³/h furnace gas, S.T.P., travelling through condiut 11 and valve 12. The multistage fluidized bed has dimensions necessary to permit removal, through a bucket wheel valve 18 and conduit 18A, of granular calcium carbide of about 150° C. consisting of particles with a size of up to about 6 mm, the granules being removed after an average residence time of 30 minutes from the lowermost stage provided therein.

By means of a valve 17, furnace gas of about 135° C. is introduced into the bottom of multistage fluidized bed 16, gradually heated therein to about 450° C. and finally removed therefrom through conduit 18B and a cyclone 19 (it is also possible for the gas to be removed through the by-pass 18C/19A (broken line) which runs past the cyclone 19). The two partial streams of furnace gas coming from the conveying zone 13, cyclone 14 and conduit 20 and from the fluidized bed apparatus 16, altogether about 62,000 m³/h, S.T.P., are mixed together in a jet blower 21, the mixed gas having a temperature of about 290° C. Next, the mixed furnace gas is delivered through conduit 9 to the bottom of fluidized bed apparatus 6. Dust materials obtained in cyclones 8 and 19 are recycled via conduits 8B and 19B and bucket wheel valves 22 and 23, respectively, to the fluidized bed apparatus 6 for coarsening the dust particles therein.

Approximately 64,000 m³/h furnace gas (S.T.P.) of about 600° C. free from dust comes from the fluidized bed apparatus 6 via conduit 6A through cyclone 8 and condiut 8A. It is introduced into a waste heat utilization zone which includes elements 24, 25, 27 described subsequently. More specifically, it is introduced into a steam generator 24 and used for generating 15 tons/h high pressure steam (90 bars; about 350° C.) from boiler feed water of about 300° C. which comes from a preheater 25.

The steam so generated is combined with the about 6.8 tons/h high pressure steam of identical pressure and temperature which is formed in jacket 58 of the fluidized bed apparatus 6. As can be inferred from this, about 21.8 tons/h of high pressure steam is taken from conduit 26. In the steam generator 24, the furnace gas of about 600° C. is cooled to about 325° C., introduced via conduit 2A into the preheater 25 for preheating boiler feed water, and further cooled therein to about 160° C., its heat being transferred to the 21.8 tons/h of boiler feed water, which becomes thereby heated from about 160° C. to about 300° C., and passes out of preheater 25 through conduit 61. A portion of the boiler feed water is introduced into steam generator 24 through conduit 63a and the remaining portion is delivered to the cooling surfaces of the fluidized bed apparatus 6 through conduit 63b. The boiler feed water is maintained under a pressure of about 90 bars. In a further preheater 27 for preheating boiler feed water, the furnace gas entering preheater 27 via conduit 25A is cooled from about 160° C. to about 40° C., 21.8 tons/h of fresh boiler feed water flowing through conduit 28 being thereby heated from about 15° C. to about 125° C.

Approximately 1800 m³/h (S.T.P.) of furnace gas is conducted upstream of furnace gas compressor 29 and delivered to dispersing gas compressor 30. A gas inlet in communication with conduit 31A provided at the inlet side of the dispersing gas compressor 30 and a valve 31 may be used for the supply of fresh furnace gas, and a valve 32 in communication with conduit 27B disposed downstream of the preheater 27 used for preheating boiler feed water permits furnace gas to be removed from the cycle.

Furnace gas compressor 29 is used for compressing about 62,200 m³/h (S.T.P.) of furnace gas, the resulting hot compressed gas being introduced via conduit 29A into an intermediate heat exchanger 33 in which the gas is cooled to about 135° C. At the same time, 21.8 tons boiler feed water coming from preheater 27 via conduit 27A with a temperature of about 125° C. is heated in heat exchanger 33 to about 160° C. and delivered to preheater 25 via conduit 33A. Next, furnace gas is conveyed through conduit 11 to valve 12 and 17 for use in pneumatically operated conveying zone 13 and in multistage fluidized bed apparatus 16, respectively.

In gas compressor 30, which compresses the furnace gas for dispersing nozzle 5, the quantity of furnace gas (1800 m³/h; S.T.P.) used as the dispersing gas is compressed under a pressure of about 8 to 10 bars, and the compressed gas is conveyed with a temperature of 240° C. to dispersing nozzle 5, through conduit 7.

A burner muffle nozzle 34 which is fed with fuel gas via conduit 33A and air or oxygen via conduit 38 is used for heating, via conduit 34A, the collecting and metering crucible 3, ducts 2 and, optionally (via conduit 34B, shown as a broken line), dispersing nozzle 5. Smoke and fuel gas are withdrawn through the outlet 52a provided in the jacket 52 of ducts 2 and can be used in ways known to those skilled in the art.

As a result of the carbide being cooled by an inert gas (i.e. a gas inert toward the carbide) in closed receptacles, less than 0.3 liter of acetylene per kg calcium carbide is lost during cooling.

Needless to say, the invention as described in the foregoing disclosure admits of various modifications without departing from the basic idea underlying it.

We claim:
1. A process for cooling and comminuting of molten calcium carbide to recover relatively cool particulate solid calcium carbide, said process comprising:
 (a) tapping off from a calcium carbide furnace a molten stream of molten calcium carbide, which stream is at a temperature of 1900° to 2100° C., and directing the molten stream to a dispersing zone, the dispersing zone including a dispersing nozzle; said calcium carbide furnace being a furnace which produces a furnace gas substantially inert toward calcium carbide;
 (b) compressing the furnace gas produced by the calcium carbide furnace to obtain a pressurized flow of furnace gas, and utilizing pressurized flowing furnace gas in subsequent steps of the process;
 (c) dispersing the molten stream in the dispersing zone with the air of the nozzle and pressurized flowing furnace gas, thereby comminuting the molten stream to form droplets of molten calcium carbide;
 (d) cooling and solidifying the droplets of calcium carbide to a temperature of about 500° to 600° C. in a first fluidized bed cooling zone comprising the comminuted calcium carbide fluidized by said pressurized flowing furnace gas;

(e) with the aid of pressurized flowing furnace gas, conveying the thus-solified calcium carbide in the form of solid particles to a second fluidized bed cooling zone comprising particles of calcium carbide fluidized by pressurized flowing furnace gas and cooling the particles of calcium carbide to below 200° C. during a calcium carbide particle residence time of less than one hour in the first and second cooling zones;

(f) conveying the further-cooled calcium carbide particles from the second cooling zone at the end of said residence time and recovering cooled calcium carbide particles, said particles being in the form of granules; and (g) recycling at least a portion of the pressurized flowing furnace gas flowing from the fluidized beds for reuse in the process.

2. The process of claim 1, wherein the calcium carbide droplets are cooled in the second fluidized bed cooling zone to about 150° C.

3. The process of claim 1, wherein part of the heat removed from the calcium carbide in the first cooling zone is introduced into a waste heat utilization zone which includes a steam generation zone.

4. The process of claim 1, wherein said process protects the comminuted calcium carbide from surface reactions sufficiently to hold the loss of yield of acetylene during said process to less than 0.3 liter of acetylene per Kg of calcium carbide.

* * * * *